United States Patent
Kasai et al.

(10) Patent No.: US 6,676,523 B1
(45) Date of Patent: Jan. 13, 2004

(54) CONTROL METHOD OF VIDEO GAME, VIDEO GAME APPARATUS, AND COMPUTER READABLE MEDIUM WITH VIDEO GAME PROGRAM RECORDED

(75) Inventors: Osamu Kasai, Tokyo (JP); Toshiyuki Mizoguchi, Tokyo (JP)

(73) Assignees: Konami Co., Ltd., Tokyo (JP); Konami Computer Entertainment Tokyo Co., Ltd., Tokyo (JP)

( * ) Notice: Subject to any disclaimer, the term of this patent is extended or adjusted under 35 U.S.C. 154(b) by 0 days.

(21) Appl. No.: 09/606,220

(22) Filed: Jun. 29, 2000

(30) Foreign Application Priority Data

Jun. 30, 1999 (JP) .......................................... H11-185430

(51) Int. Cl.[7] .......................... A63F 13/00; A63F 9/24; G06F 17/00; G06F 19/00
(52) U.S. Cl. ................................. 463/43; 463/1; 463/7; 463/30; 463/42; 273/461; 273/148 R; 434/156; 434/167; 704/4; 704/9
(58) Field of Search ............................... 463/42, 31, 43, 463/30, 44, 45, 46, 35, 36, 37, 38, 1; 434/156, 167; 273/454, 459, 460, 461, 148 R, 148; 704/1, 2, 3, 4, 5

(56) References Cited

U.S. PATENT DOCUMENTS

| | | | | |
|---|---|---|---|---|
| 5,393,071 A | * | 2/1995 | Best | 273/434 |
| 5,393,072 A | * | 2/1995 | Best | 273/434 |
| 5,393,073 A | * | 2/1995 | Best | 273/434 |
| 5,604,855 A | * | 2/1997 | Crawford | 395/173 X |
| 5,807,174 A | | 9/1998 | Fukuhara et al. | |
| 5,873,057 A | * | 2/1999 | Eves et al. | 704/201 X |
| 5,943,049 A | * | 8/1999 | Matsubara et al. | 345/338 |
| 6,001,015 A | * | 12/1999 | Nishiumi et al. | 463/38 X |
| 6,287,196 B1 | * | 9/2001 | Kawano | 463/23 X |
| 6,290,602 B1 | * | 9/2001 | Kawano | 463/23 X |

* cited by examiner

Primary Examiner—Teresa Walberg
Assistant Examiner—Binh-An D. Nguyen
(74) Attorney, Agent, or Firm—Lowe Hauptman Gilman & Berner, LLP

(57) ABSTRACT

A video game with a main game process and a subsequent ending process including, if an interrupt request of a game character calling to a player character occurs, acquiring a progress of game at that time, and acquiring the voice message data of calling in accordance with an emotional value. Further, it includes outputting the intonation, volume or total average pitch of the voice message data, as required, variably in accordance with a game scene, a conversation context or a state of the game character. The voice message of calling to the player character is varied in accordance with the progress of game.

13 Claims, 14 Drawing Sheets

Fig. 7

| Family name | Takasugi |
|---|---|
| Name | Takashi |
| Date of birth | 7, 7, 1982 |
| Blood type | B |

Fig. 10

| Game character name | Emotional value | | | | | | | | | Confession |
|---|---|---|---|---|---|---|---|---|---|---|
| | 1 | 2 | 3 | 3+ | 4 | 4# | 5@ | 5* | 6 | |
| Aso Kasumi | | | Name + kun | | | | | | | Name + kun |
| Hinoshita Hikari | | | Name + kun | | | | | | | Name + chan |
| Minazuki Kotoko | | | Anata | | | | | | | Family name + kun |
| Kotobuki Miyuki | (none) | | | | Nickname | | | | | Nickname |
| Ichimonji Akane | Kimi | | | | Name + kun | | | | | Name + kun |
| Shirayuki Miho | Anata | | | | Family name + san | | | | | Family name + san |
| Akai Homura | Omae | | | | Only name | | | | | Only name |
| Yaebana Ouri | (none) | | | | Family name + kun | | | | | Family name + kun |
| Sakura Kaedeko | Anata | | | | Family name + san | | | | | Family name + san |
| Ijyuuin Mei | Kisama | | | | Only family name | | | | | Family name + senpai |
| Shirayuki Maho | (According to condition of Miho) | | | | | | Name + kun | | | Name + kun |

Fig. 11

| Emotional value | Calling words |
|---|---|
| 1, 2 | Takashi kun |
| 3~6+ | Takashi kun |
| Confession | Takashi chan |

CONTROL METHOD OF VIDEO GAME, VIDEO GAME APPARATUS, AND COMPUTER READABLE MEDIUM WITH VIDEO GAME PROGRAM RECORDED

BACKGROUND OF THE INVENTION

1. Field of the Invention

The present invention relates to a control method of a video game having a voice message output feature, a video game apparatus, and a computer readable medium with a video game program recorded.

2. Description of the Related Art

Conventionally, a video game has been well known in which a player character acts on a game space in lieu of a player and in accordance with an operation of the player on a controller having a preset program and a plurality of operation keys, a game character acts on the game space simply in accordance with the program, and the player character can interact with the game character to handle an event or proceed with the game (some games may display no player character on the screen directly).

Also, a video game referred to as an emotion simulation game has been conventionally well known. This video game is configured to give a player presence on the scene, because a player character acting for the player is communicating with a game character by simulation through the action of the player character on the game character. Moreover, this video game varies a parameter indicating the relation (throbs of pleasure, friendliness, referred to as an emotional value) between the player character and the game character in conformance with the action of the player character on the game character, and changes the story or ending in accordance with this parameter.

Most of these video games have a feature of producing a BGM or effective sound, and outputting a voice message (language spoken by man) from the game character. Also, most of these video games allowed the player to set a player character name (e.g., player's name) at will by inputting the player character name.

In the conventional video games, a calling of the game character to the player character simply appeared on a video screen, thereby bringing about still poor presence on actual conversation.

In this case, some video games allowed the player to change a calling word of the game character to the player character on the video screen in accordance with the parameter as before. However, this change is simply a change of calling word on the video screen, resulting in still poor presence on actual conversation.

Also, some video games subjected a name which the player inputs and sets at will to speech synthesis for output, but had also less variation as it could be output only with a predetermined or initially set way of calling or intonation.

SUMMARY OF THE INVENTION

It is an object of the present invention to provide a control method of a video game in which a voice message of calling to a player character is changed in accordance with a progress of the game, a video game apparatus, and a computer readable medium with a program of video game recorded therein.

In order to attain the above object, the present invention provides a control method of a video game for proceeding with a game in such a way that a player character and a game character communicate in accordance with an operation of a player, in which the game character issues a voice message, comprising the steps of providing a plurality of voice messages of the game character calling to the player character in accordance with a progress of the game, and selectively outputting one of the voice messages in accordance with the progress of the game, when the game character calls to the player character.

According to the present invention, a calling of the game character to the player character is output as a voice message, so that one can enjoy the presence on actual conversation. In this case, one of the voice messages is selectively output in accordance with a progress of game, so that one can enjoy the excitement and feeling full of actual sense.

Among a plurality of voice messages of the game character calling to the player character, at least one may be a voice message consisting of a character string input and set by the player at will, particularly, a voice message which is created based on a family name or name of the player, or both. Thereby, one can enjoy the presence as if the player entered a game space.

In the case where a plurality of game characters exist, a plurality of voice messages of the game character calling to the player character may be varied for each game character. Consequently, the more actual excitement and feeling can be enjoyed.

Also, in order to attain the above object, the present invention provides a control method of a video game for proceeding with a game in such a way that a player character and a game character communicate in accordance with an operation of a player, in which the game character issues a voice message, wherein at least one of the intonation, volume, and total average pitch for the voice message of the game character calling to the player character is output variably in accordance with a progress of the game.

According to the present invention, a calling of the game character to the player character is output as a voice message, so that one can enjoy the presence on actual conversation. In this plurality of accent types of a voice message on the screen in creating and registering the voice message, and enabling the player to select them at will. Also, they may involve reproducing at least one of the voice messages created in practice and enabling the player to hear it.

And such a video game can be realized by a video game apparatus for proceeding with the game in such a way that a player character and a game character communicate in accordance with an operation of a player, in which the game character issues a voice message, comprising means for inputting and setting a character string representing a way of calling the player character in accordance with an operation of the player, means for creating a plurality of voice messages in accordance with a progress of the game as the voice message of the game character calling to the player character, based on the set character string representing the way of calling the player character or a preset calling word, means for registering the plurality of voice messages created corresponding to the progress of the game, and means for selectively reading one of the plurality of voice messages registered by the registering means in accordance with the progress of the game, when the game character calls to the player character, or a video game apparatus additionally comprising means for storing a mode in creating the plurality of voice messages in accordance with the progress of the game for each of the plurality of game characters, or a video game apparatus additionally comprising means for changing at least one of the intonation, volume and total average pitch of the voice message read out in accordance with the progress of the game.

Also, such a video game can be realized by a video game apparatus for proceeding with the game in such a way that a player character and a game character communicate in accordance with an operation of a player, in which the game character issues a voice case, since at least one of the intonation, volume, and total average pitch of the voice message is output variably in accordance with a progress of game, one can enjoy the excitement and feeling full of more actual sense.

In this invention, the progress of game means a parameter indicating the relation between a player character and a game character, or a game scene, or a conversation context, or a state of the game character.

More specifically, the method of the present invention can be stated as inputting and setting a character string representing a way of calling a player character in accordance with an operation of a player, creating and registering a plurality of voice messages in accordance with a progress of a game as the voice message of a game character calling to the player character, based on the set character string representing the way of calling the player character or a preset calling word, and selectively reading and outputting one of the plurality of voice messages registered in accordance with the progress of the game, when the game character calls to the player character.

Also, more specifically, the method of the present invention can be stated as inputting and setting a character string representing a way of calling a player character in accordance with an operation of a player, creating and registering at least one voice message as the voice message of a game character calling to the player character, based on the set character string representing the way of calling the player character or a preset calling word, and reading a registered voice message and outputting at least one of the intonation, volume and total average pitch of the voice message variably in accordance with a progress of a game, when the game character calls to the player character.

These control methods of video game involve displaying a message, comprising means for inputting and setting a character string representing a way of calling the player character in accordance with an operation of a player, means for creating at least voice message as the voice message of the game character calling to the player character, based on the set character string representing the way of calling the player character or a preset calling word, means for registering the voice message created, and means for changing at least one of the intonation, volume and total average pitch of the voice message registered by the registering means in accordance with a progress of the game, when the game character calls to the player character.

In these video game apparatuses, means for creating the voice message may be provided with a function of displaying a plurality of accent types for the voice message on the screen, and enabling the player to select them at will.

Also, such a video game can be realized by a computer readable medium having recorded a video game program for proceeding with the game in such a way that a player character and a game character communicate in accordance with an operation of a player, in which the game character issues a voice message, wherein when the video game program is read by a computer, the computer readable medium enables the computer to perform the steps of inputting and setting a character string representing a way of calling the player character in accordance with an operation of the player, creating and registering a plurality of voice messages in accordance with a progress of the game as the voice message of the game character calling to the player character, based on the set character string representing the way of calling the player character or a preset calling word, and selectively reading and outputting one of the plurality of voice messages registered in accordance with the progress of the game, when the game character calls to the player character, or the computer readable medium enables the computer to perform the steps of inputting and setting a character string representing a way of calling the player character in accordance with an operation of the player, creating and registering at least one voice message as the voice message of the game character calling to the player character, based on the set character string representing the way of calling the player character or a preset calling word, reading the voice message registered, when the game character calls to the player character, and outputting at least one of the intonation, volume and total average pitch of the voice message variably in accordance with the progress of the game.

In such a computer readable medium having a video game program recorded, when creating and registering a voice message, a plurality of accent types for the voice message may be displayed on a screen to enable the player to select them at will.

The above and other objects, features and advantages of the present invention will be clear from the following description and accompanying drawings.

BRIEF DESCRIPTION OF THE DRAWINGS

FIG. 7 is a diagram illustrating the player character information which has been input and set up;

FIG. 10 is a diagram illustrating the game character personal information;

FIG. 11 is a diagram illustrating a way of calling after a modification process;

DESCRIPTION OF THE PREFERRED EMBODIMENTS

Figure 1:
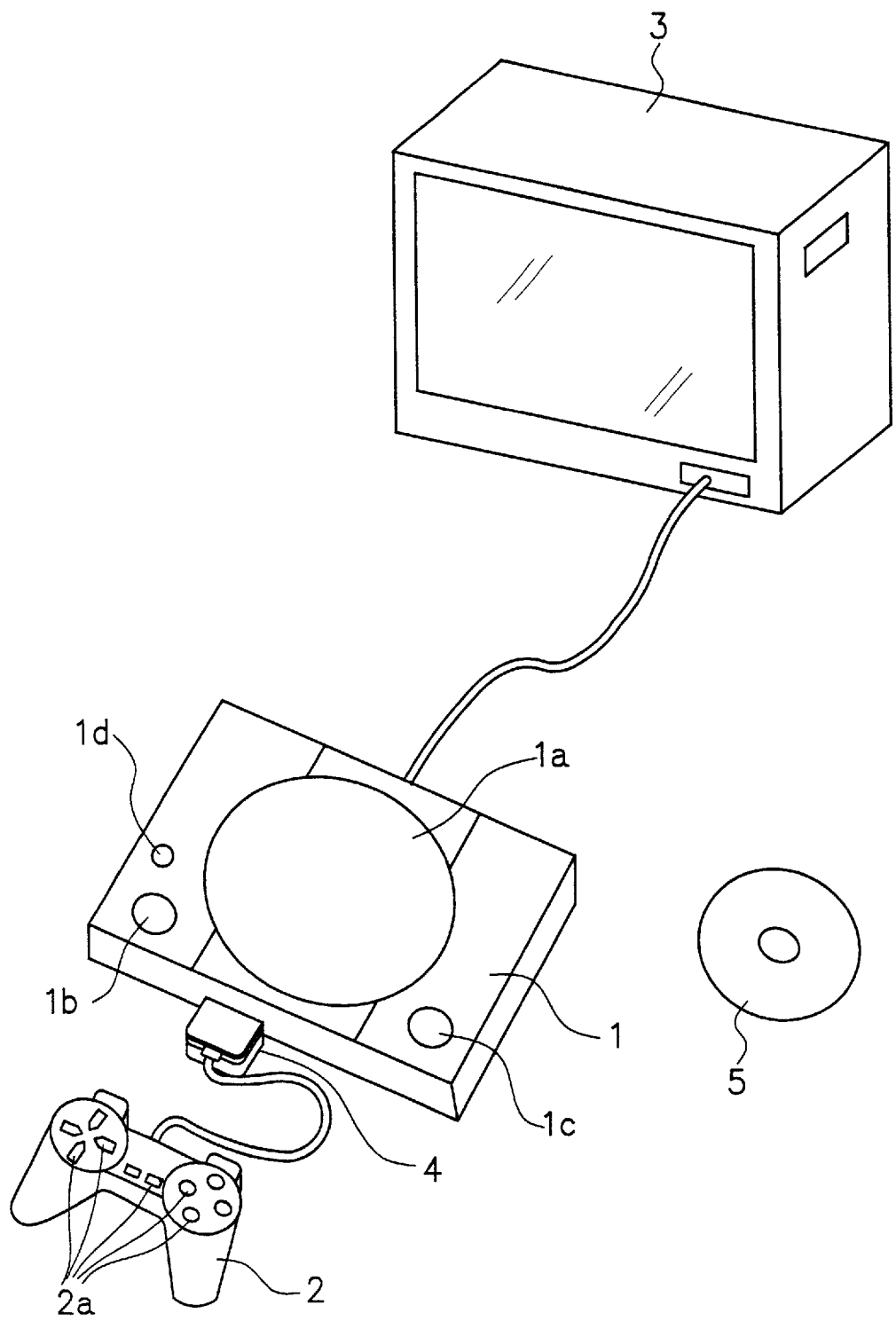
FIG. 1 is a schematic view showing a video game apparatus for implementing a video game of the present invention.

FIG. 1 is a schematic view showing a video game apparatus or a home video game machine for implementing a video game of the present invention. In the figure, reference numeral 1 denotes a game machine main unit. Reference numeral 2 denotes a controller, having a plurality of operation keys 2a, for issuing a variety of commands to the game machine main unit 1. Reference numeral 3 denotes a monitor such as a TV, connected to the game machine main unit 1, for outputting a game screen or music. Reference numeral 4 denotes an external storage device or a memory card, mounted on the game machine main unit 1, for storing the save data of the game. Reference numeral 5 denotes a recording medium or a CD-ROM which has recorded a game program executable in the game machine main unit 1 or data.

The CD-ROM 5 is mounted into a CD-ROM drive (not shown) on an upper face of the game machine main unit 1 with an enclosed lid 1a for the CD-ROM. The program or data of the CD-ROM 5 can be read into the game machine main unit 1. Reference numeral 1b denotes a power switch, reference numeral 1c denotes an opening button for the enclosed lid 1a, and reference numeral 1d denotes a reset switch.

Figure 2:
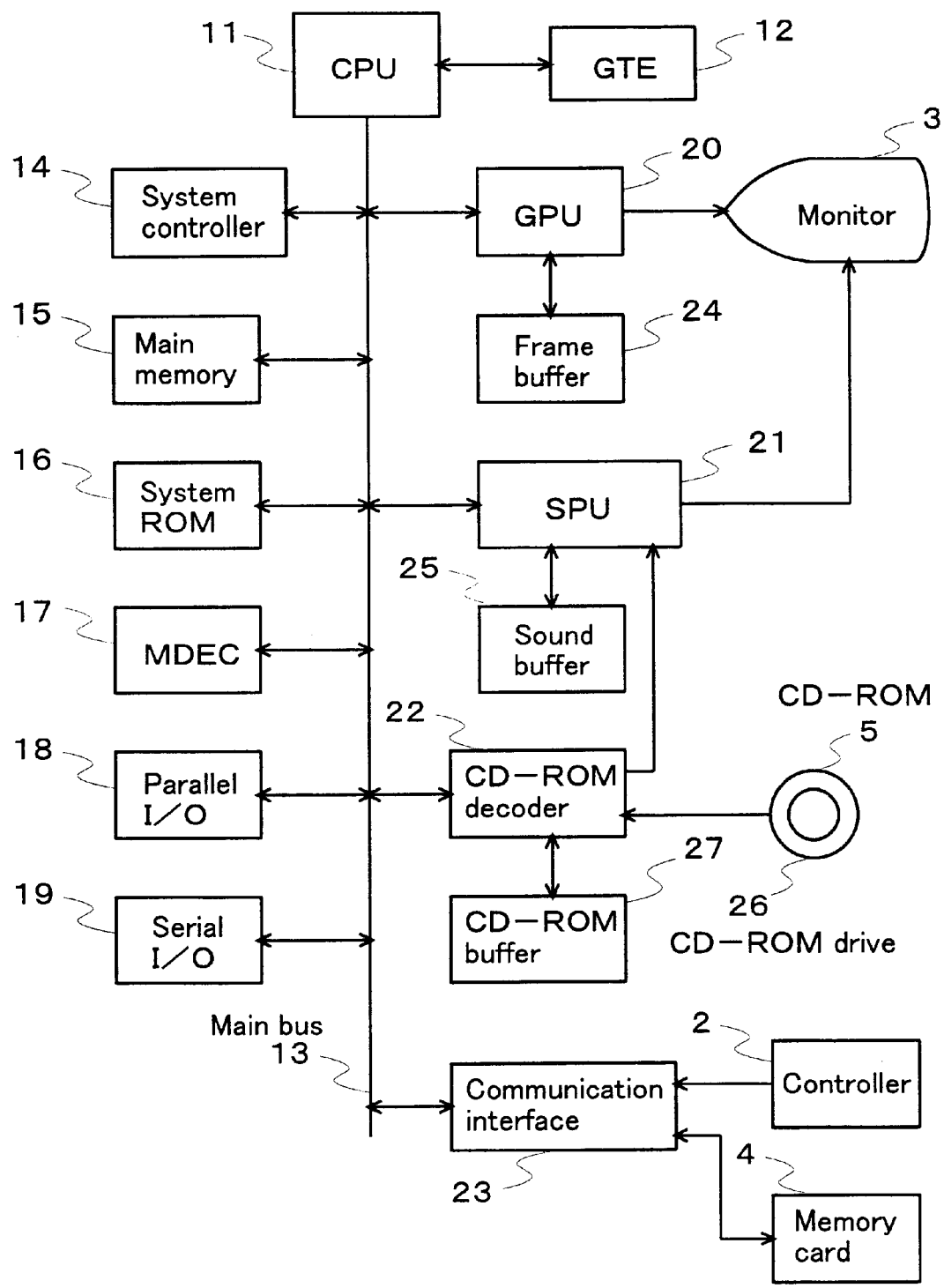
FIG. 2 is a circuit block diagram in detail of a game machine main unit.

FIG. 2 is a circuit block diagram in detail of the game machine main unit 1. This game machine comprises a CPU (Central Processing Unit) 11, an image data generating processor (GTE) 12 directly connected to this CPU 11, a system controller 14, a main memory 15, a system ROM 16, an image data expanding decoder (MDEC) 17, a parallel interface (I/O) 18, a serial interface (I/O) 19, an image processing unit (GPU) 20, a sound processing unit (SPU) 21, a CD-ROM decoder 22 and a communication interface 23, which are connected via a main bus 13 to the CPU 11, a frame buffer 24 connected to the image processing unit 20, a sound buffer 25 connected to the sound processing unit 21, and a CD-ROM drive 26 and a CD-ROM buffer 27 which are connected to the CD-ROM decoder 22.

The image data generating processor 12 performs the operation having a large amount of data such as coordinate transformation or ray tracing in parallel processing, based on an instruction from the CPU 11. A main processing of this image data generating processor 12 involves locating an address on a display area of an image of processing object based on the coordinate data, movement data and rotation data of each apex in a two or three-dimensional plane of image data supplied from the CPU 11, and returning this address data to the CPU 11, or calculating the luminance of the image in accordance with the distance or angle from a light source virtually set up.

The system controller 14 performs the controls including an interrupt control, a time control, a memory control, and a direct memory access (DMA) transfer. The main memory 15 stores temporarily a game program and data from the CD-ROM 5 and stores various sorts of data involved in a game. The system ROM 16 stores a basic program for the game machine main unit 1.

The image data expanding decoder 17 decodes image data for static image or animation compressed and encoded by the MPEG or JPEG which is read from the CD-ROM 5 and stored in the main memory 15. The image processing unit 20 performs a drawing process for the frame buffer 24 in accordance with a drawing instruction from the CPU 11 to produce a video signal on a game screen which is drawn within this frame buffer 24 and output it to the monitor 3.

The sound processing unit 21 produces a speech signal including BGM, an effective sound and a voice message using the sound buffer 25 in accordance with an instruction from the CPU 11 and output it to the monitor 3 (or other audio systems). The CD-ROM decoder 22 decodes a program or data encoded by error correction in the CD-ROM 5 by reading it via the CD-ROM drive 26, and temporarily storing it in the CD-ROM buffer 27 for error correction, and then supplies an original program or data to the main memory 15 or the speech processing unit 21.

The communication interface 23 makes a communication control between the CPU 11 and the controller 2 and the memory card 4 via the main bus 13, to transfer a command input from the controller 2 to the CPU 11, and store a variety of parameters during interruption of game in the memory card 4.

Figure 3:
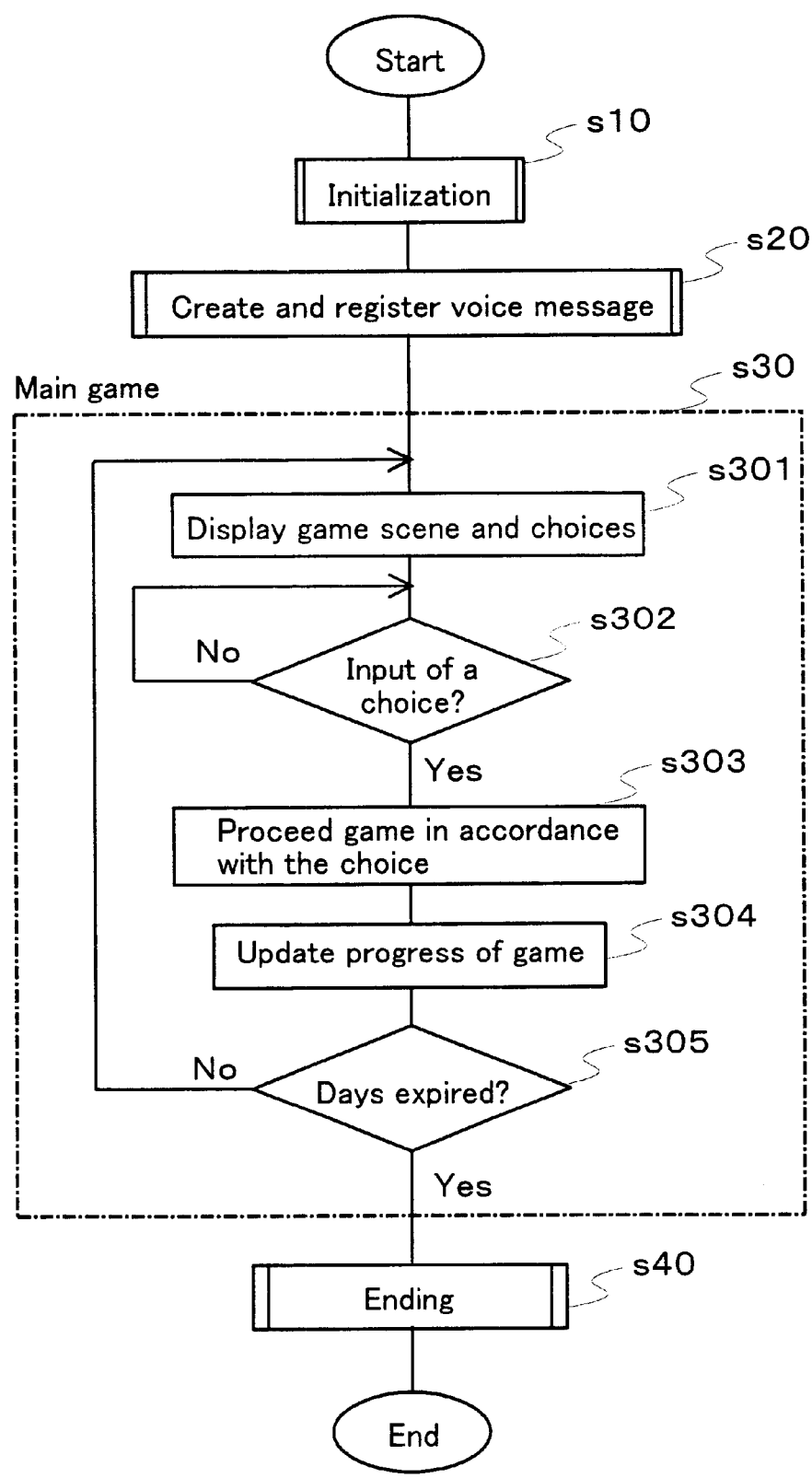
FIG. 3 is a flowchart showing an overall process of a control method for a video game of the present invention.
Figure 4:
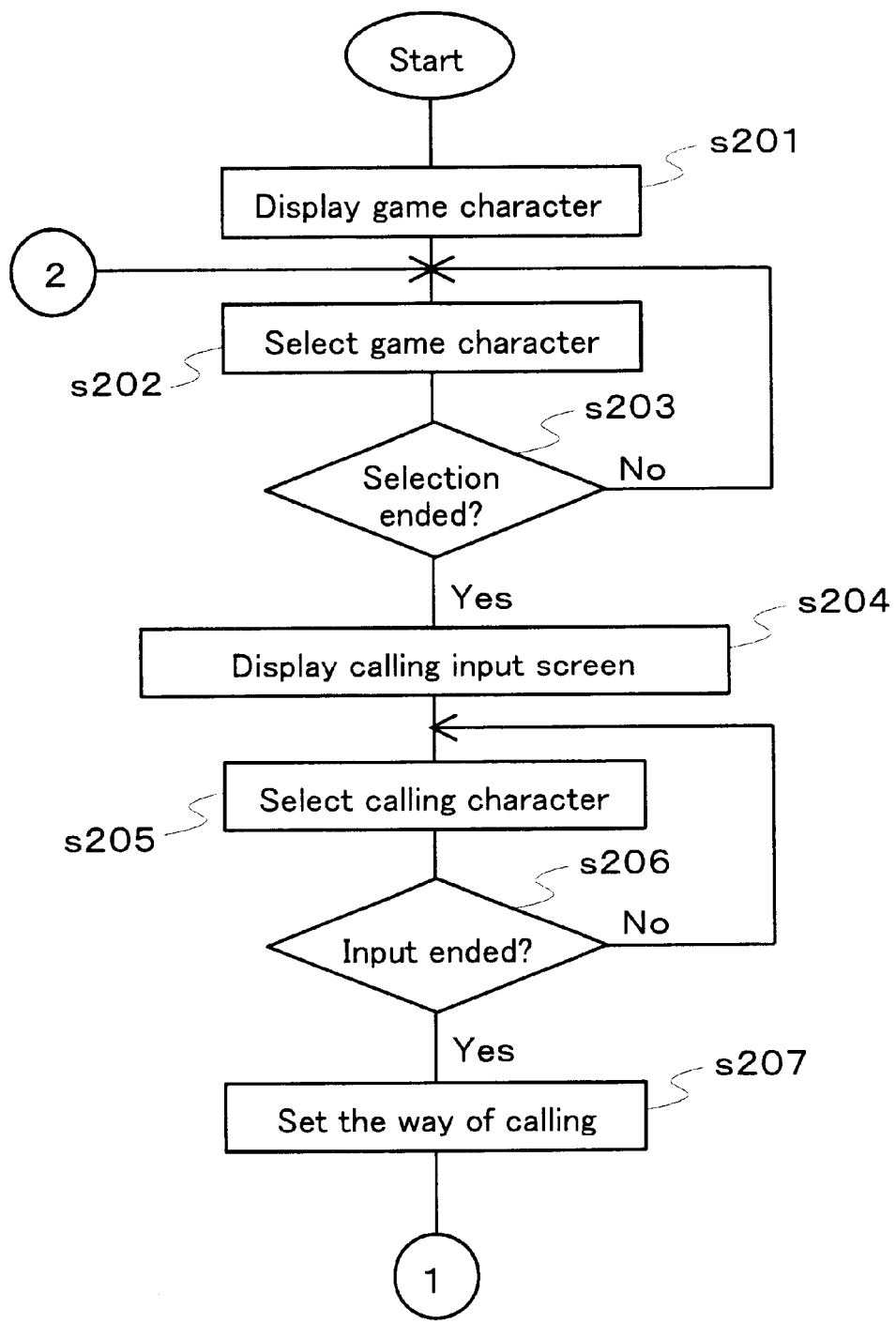
FIG. 4 is a flowchart showing the details of a voice message creating and registering process in FIG. 3.
Figure 5:
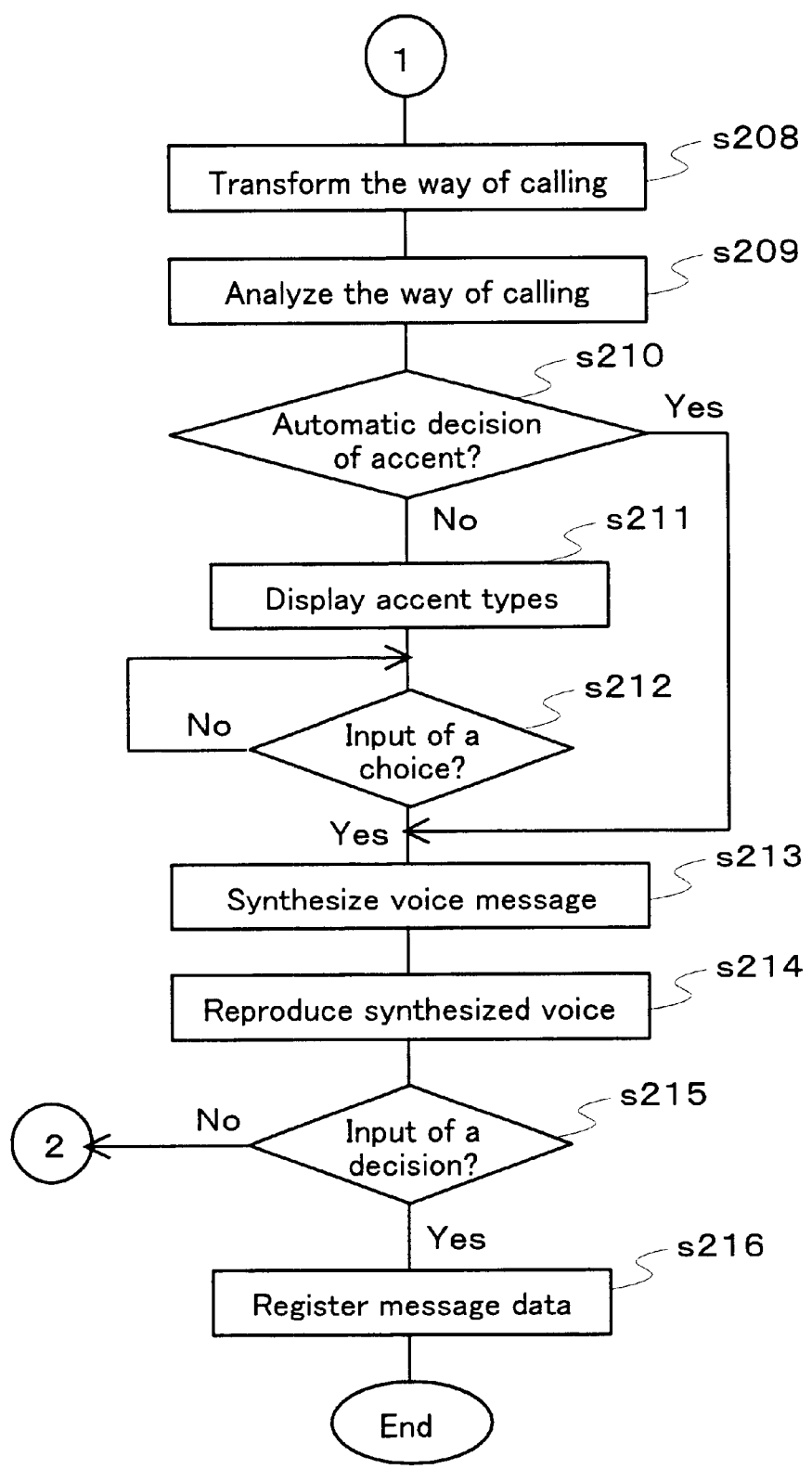
FIG. 5 is a flowchart showing the details of the voice message creating and registering process in FIG. 3.
Figure 6:
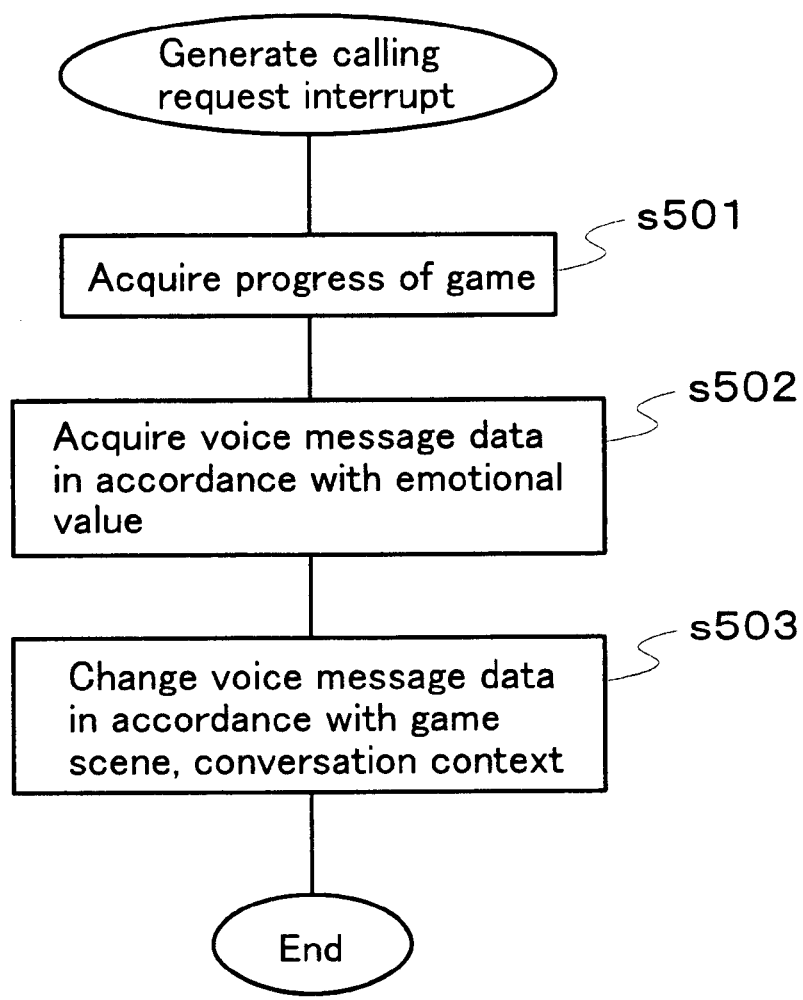
FIG. 6 is a flowchart showing the details of a calling request interrupt process which may occur in a main game process in FIG. 3.

FIG. 3 is a flowchart showing the overall process of a control method according to the present invention. FIGS. 4 and 5 show the details of a voice message creating and registering process in FIG. 3. FIG. 6 shows the details of a calling request interrupt process which may occur in the main game process of FIG. 3.

The present invention will be described below by way of example for a game having the following settings. Namely, a player character is a high school student, and a game character is a classmate. A scenario program having a number of branches is prepared. A player selects a command which is prepared, or inputs an arbitrary command to proceed with the game. A game story may change in accordance with this selected or input command. If the story proceeds, and predetermined days elapse, an ending appears in accordance with an emotional value of a game character for a player character at that time (multi-story and multi-ending).

First, the player sets a CD-ROM 5 having a game program recorded in the game machine main unit 1. Then, the power switch 1b is turned on. The game machine passes through the normal game processing (omitted in the flowchart) including an initial screen display (maker logo display), a check for the memory card 4, an title screen display, and data load, and then transfer to an initial setting process (s10).

The initial setting process is a well-known process in which the player inputs and sets the information as to a player character, viz., family name, name, date of birth, and blood type, by operating the controller 2, on a screen (or screens) having a display of a variety of kanji, hiragana, katakana, and numbers (not shown). FIG. 7 shows an example of settings.

The procedure then transfers to a voice message creating and registering process (s20). In this process, the game machine displays a plurality of game characters which are provided (s201), to choose a game character who makes a calling with a voice message during the game, as shown in FIG. 4. The player is allowed to choose the game character.

Figure 8:
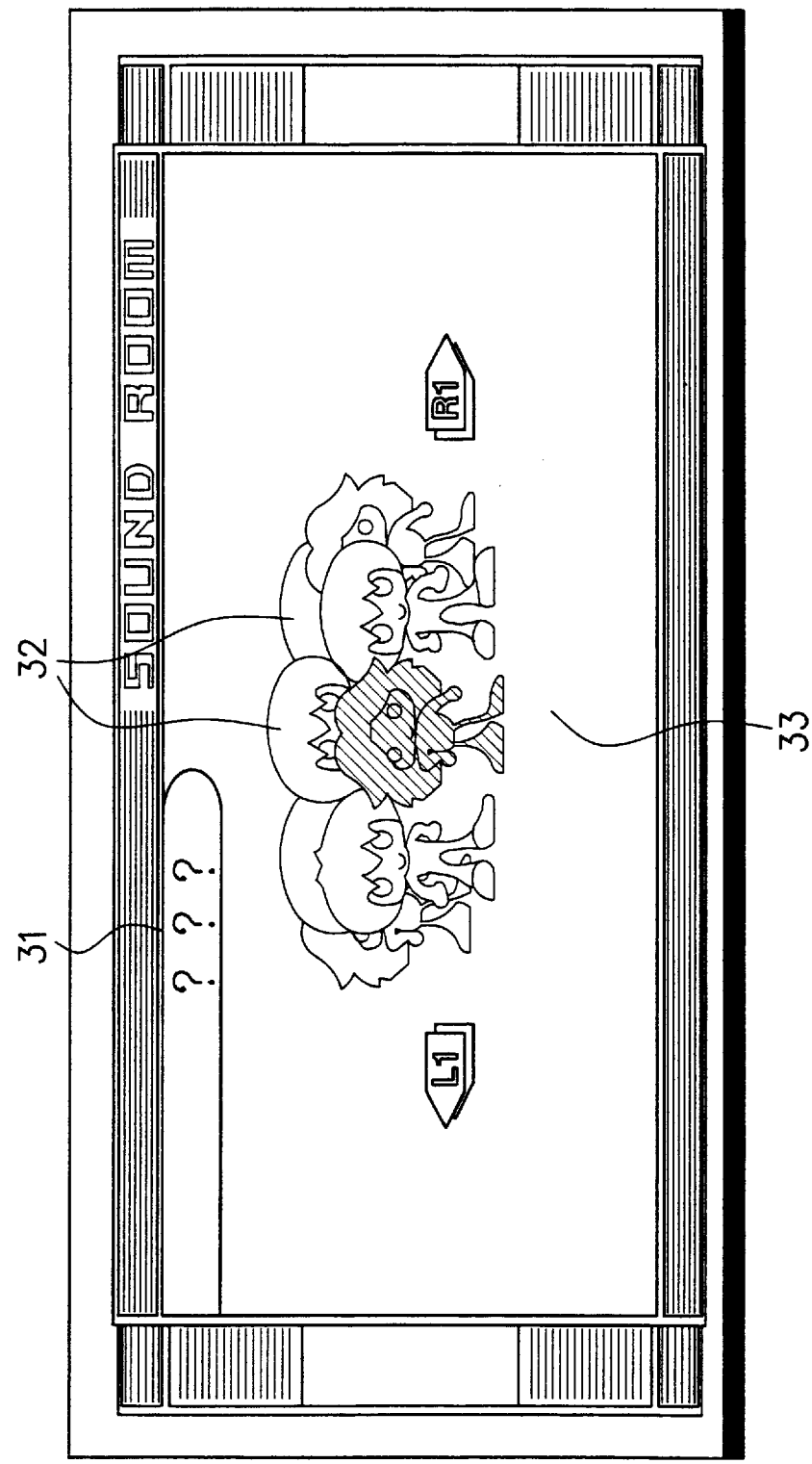
FIG. 8 is a view illustrating a game character selection screen.

FIG. 8 illustrates a game character selection screen. In this screen, a part of information as to the player character which has been set up, viz., an indication column 31 of name "???" in FIG. 8) is disposed on the upper left side. Also, plural or eight character images 32 placed like a ring are displayed substantially in the central portion of this screen. A name 33 of a game character being selected (indicated by the hatching in the figure) who is located in the front is displayed beneath the character image.

On this screen, if the player operates a predetermined key of the controller 2, the arrangement of game characters can be rotated to change the game character being selected, and change the name 33 accordingly. At this point, the player operates the controller 2 to decide a game character who enables a calling with a voice message (s202).

If the selection of game character is ended (s203), the game machine displays an input screen for a character string representing a way of calling the player character (s204). The player is allowed to input the character string representing the way of calling the player character.

Figure 9:
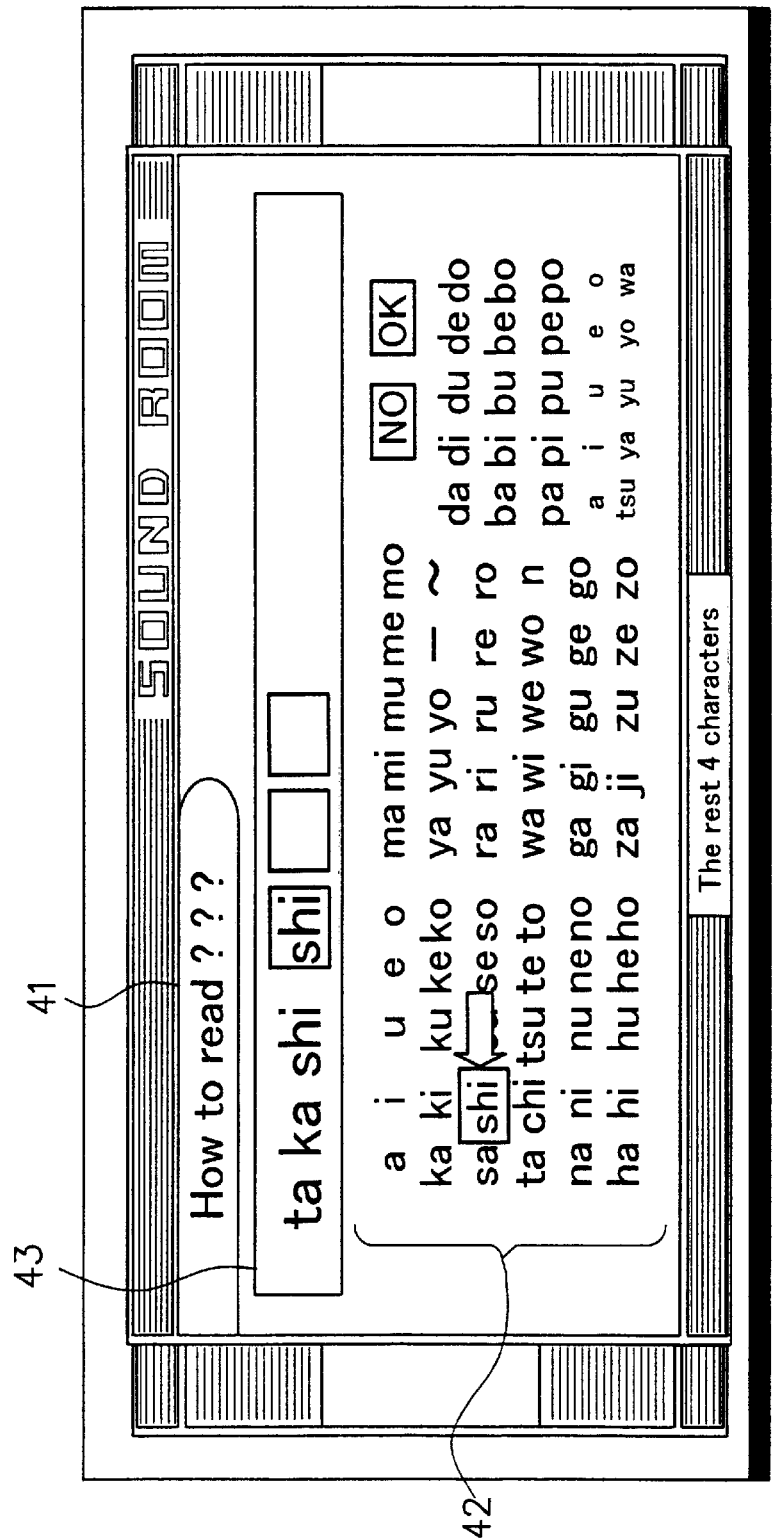
FIG. 9 is a view illustrating an input screen of a character string representing a way of calling a player character.

FIG. 9 illustrates the input screen for the character string representing the way of calling the player character. On the upper left side of this screen, an indication column 41 of the player character name which has been set is disposed. Also, the selectable characters 42 including sonants, p-sounds and double consonants, in addition to hiragana 50 characters, are arranged on the lower portion of this screen. Above them, an indication column 43 of the character string representing the way of calling the player character selected "Takashi" in FIG. 8) is disposed.

On this screen, if the player selects a character by operating the controller 2, the selected character is displayed on the indication column 43. The player operates the controller 2 to determine the way of calling (s205).

If the input of character string is ended (s206), the game machine sets and registers the way of calling the player character which has been input (s207).

Then, the game machine transforms the way of calling the player character which has been set in correspondence to the selected game character (s208).

How to transform the way of calling the player character is predetermined for each game character and each emotional value, and stored as the game character personal information. FIG. 10 shows one example of game character personal information.

In Japanese, generally, the way of calling may be often transformed, depending on whether or not a title is attached after name or surname(Family name), or which title "kun," "chan," "san," "senpai" and so on in the illustrated example) is attached.

As will be understood from FIG. 10, some game characters sometimes use a calling word "kimi," "anata," "omae," "kisama" and so on in the illustrated example) which has been prepared, irrespective of the character string representing the way of calling the player character which has been input and set. Also, some game characters may automatically create a nickname from the character string representing the way of calling the player character. Further, some game characters use no calling word "none" in the illustrated example).

Accordingly, in the case where the game character is selected to "Hinoshita Hikari," a way of calling (calling word) after transformation of the way of calling the player character as shown in FIG. 9 is as shown in FIG. 11.

Then, the game machine analyzes the character string for the transformed way of calling the player character (s209). On the basis of a variety of dictionaries for speech synthesis which are provided, it is determined whether or not the accent is automatically determined (s210).

Figure 12:
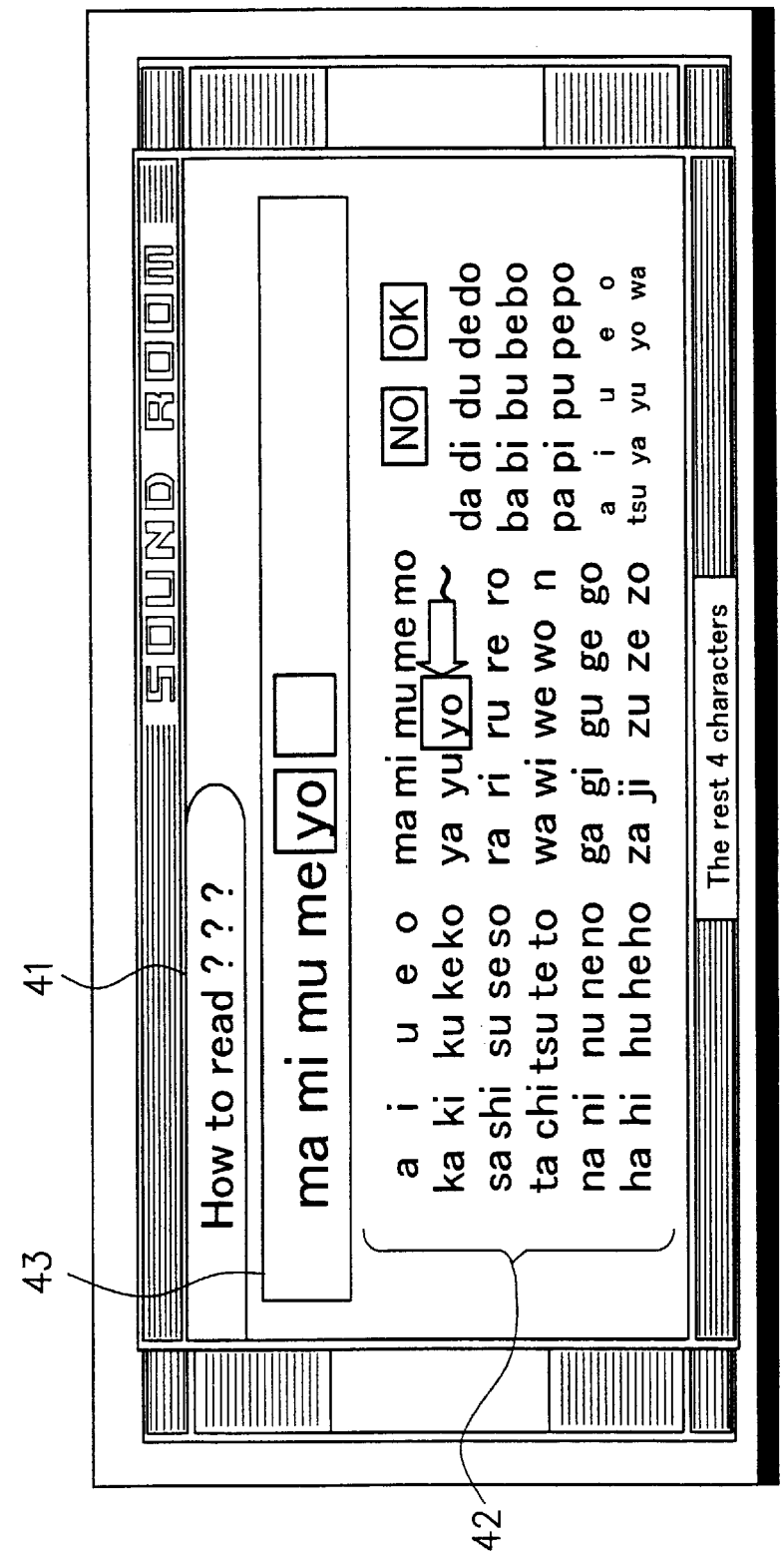
FIG. 12 is a view illustrating another input screen of a character string representing a way of calling a player character.

At this point, in the case where the way of calling the player character which has been set in the input and setting process of the way of calling the player character is a special name as indicated in FIG. 12, and the accent can not be decided automatically, the game machine displays a plurality of accents which are prepared in accordance with the number of characters (or molar number) (s211).

Figure 13:
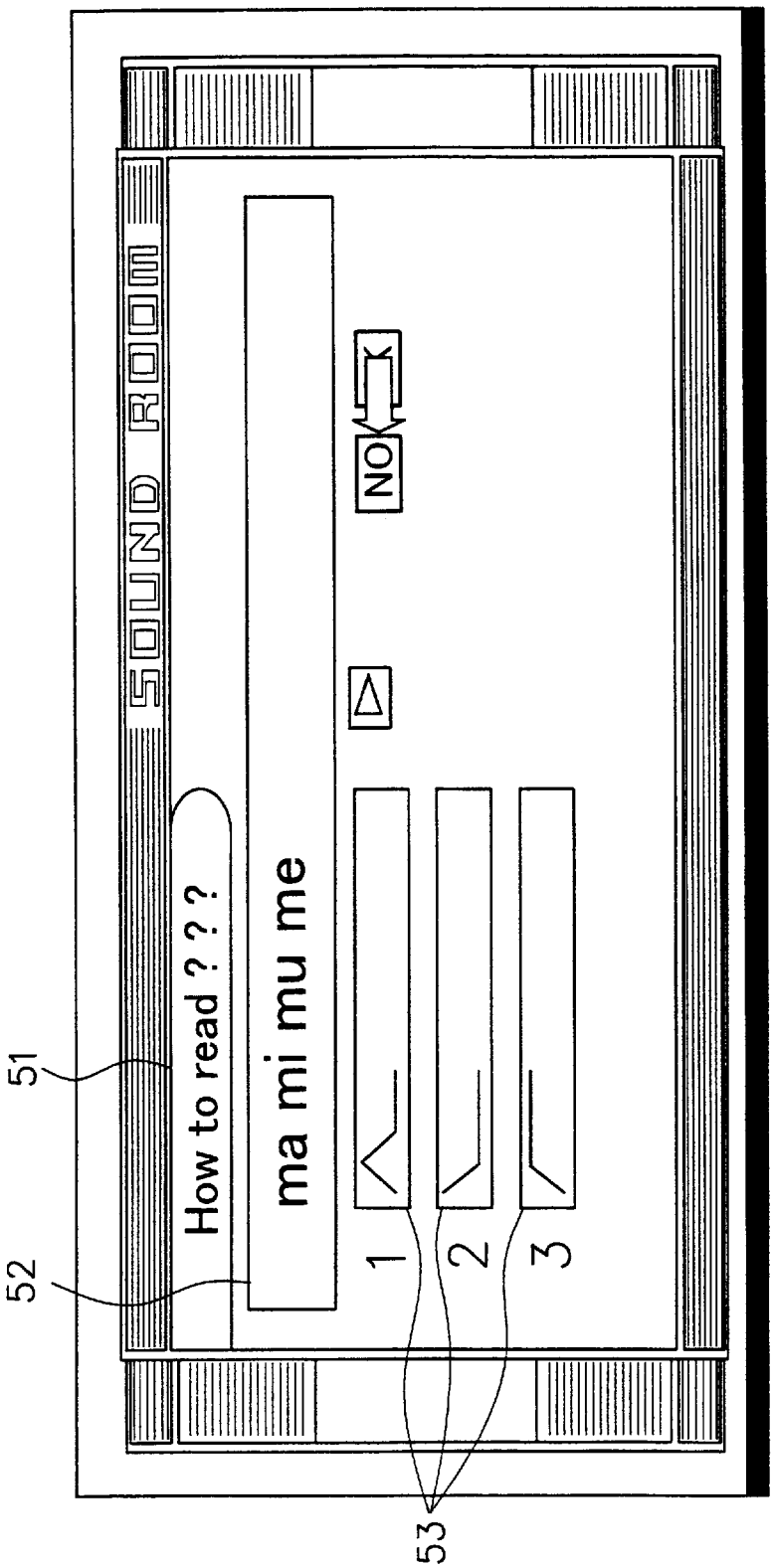
FIG. 13 is a view illustrating an accent type display screen.

FIG. 13 illustrates an accent type display screen. On the upper left side of this screen, an indication column 51 of the player character which has been set up is arranged. Beneath it, an indication column 52 of the character string indicating the way of calling the player character which has been selected and input is arranged. Further, beneath it, an indication column 53 for plural or three accent types is arranged.

As described previously, in the case where the accent type is decided automatically, or where the accent type is decided by the player operating the controller 2 to select and input one of plural accent types which are displayed (s212), the game machine performs synthesis of the voice message corresponding to the way of calling the player character after transformation (s213), and reproduces the voice message synthesized (s214).

In this case, the synthesis and reproduction of voice message are made only for a calling word having the lowest emotional value among a plurality of calling words for emotional values as shown in FIG. 11.

The player listens to a reproduced voice message, and if pleased with it, the player operates the controller 2 to decide and input it (s215). Then, the game machine makes synthesis of voice messages corresponding to remaining calling words among a plurality of calling words for emotional values as shown in FIG. 11, and registers the data of these voice messages for,each emotional value (s216).

When not pleased with the reproduced speech, the player can operate the controller 2 to enter a cancel. Thereby, the game can be retried from the selection of game character.

Then, the game machine transfers to a main game process (s30). Its detailed content is not a gist of the present invention, like an ending process (s40), and is only outlined.

The main game process displays an image of game scene and choices (s301) in accordance with a scenario program provided. And it outputs BGM, an effective sound and a voice message as required. In this case, the player operates the controller 2 to pick up and input a choice (s302). Then, it proceeds with a story of game in accordance with the choice picked up (s303). And it calculates the emotional value for the game character to the player character to update the progress of the game (s304). The above procedure is repeated till the expiry of days of game (s305).

Also, the ending process displays or produces a happy or unhappy ending screen or voice in accordance with the emotional value of game character obtained in the main game process.

In such main game process and subsequent ending process, if there occurs a scene where the game character makes a call to the player character to cause a calling request interrupt, the game machine acquires a game progress at that time (s501), as shown in FIG. 6. And it acquires the calling voice message data in accordance with the emotional value (s502). Further, it changes the intonation, volume or total average pitch minutely in accordance with the game scene, conversation context or game character condition (s503).

The game machine sends the voice message data obtained in this manner, like the normal voice message data, to a sound processing unit (SPU) 12. Thereby, the voice message of calling to the player character can be variably output in accordance with the progress of game.

Figure 14:
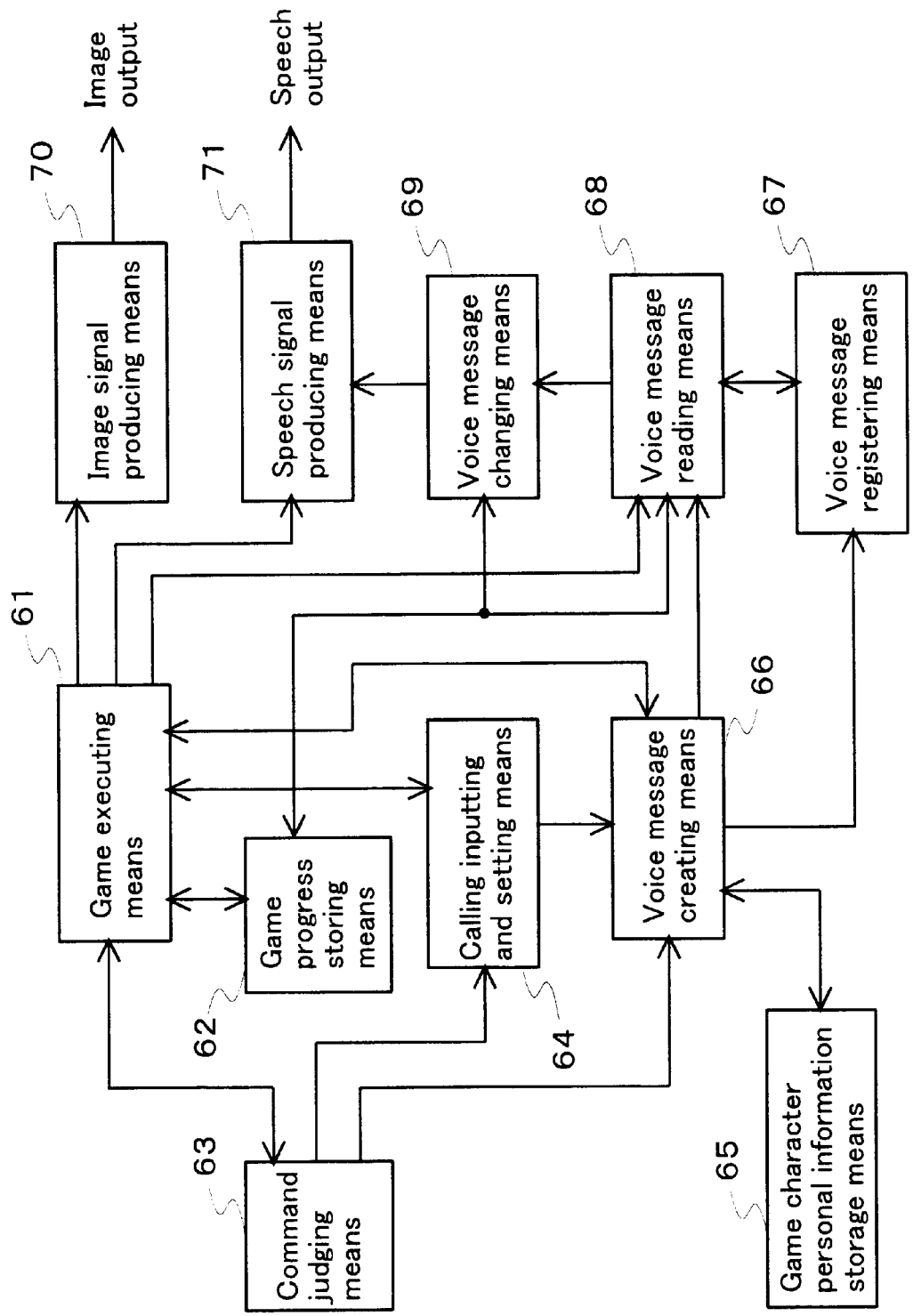
FIG. 14 is a functional block diagram of a video game apparatus according to the present invention.

FIG. 14 is a functional block diagram of a video game apparatus according to the present invention. In the figure, reference numeral 61 denotes game executing means. Reference numeral 62 denotes game progress storing means. Reference numeral 63 denotes command judging means. Reference numeral 64 denotes calling inputting and setting means. Reference numeral 65 denotes game character personal information storage means. Reference numeral 66 denotes voice message creating means. Reference numeral 67 denotes voice message registering means. Reference numeral 68 denotes voice message reading means. Reference numeral 69 denotes voice message changing means. Reference numeral 70 denotes image signal producing means. And reference numeral 71 denotes speech signal producing means.

The game executing means 61 executes a game in accordance with a program by reading the program or data as required from the CD-ROM 5 having the game program or character data recorded, and temporarily storing it, and sends image information and voice information to the image signal producing means 70 and the speech signal producing means 71.

The game progress storing means 62 stores the game progress including the emotional value of the game character to the player character, game scene, conversation context, and game character condition, which are updated along with the execution of game.

The command judging means 63 judges which command the player entered, on the basis of a program stored in the game executing means 61, by detecting an operation of the player on the controller 2, and sends a command to each means in accordance with its result.

The calling inputting and setting means 64 inputs and sets a character string indicating the way of calling the player character, on the basis of the program stored in the game executing means 61, and in accordance with the command input from the command judging means 63.

The game character personal information storage means 65 stores the mode, for each of a plurality of game characters, in producing a plurality of voice messages in accordance with the game progress, or in particular the emotional value of the game character to the player character.

The voice message producing means 66 produces the data for a plurality of voice messages of the game character calling to the player character from the character string or preset calling word indicating the way of calling the player character which has been set, on the basis of the program stored in the game executing means 61 and the information stored in the game character personal information storage means 65, and in accordance with the command input from the command judging means 63.

The voice message registering means 67 registers the data for the plurality of voice messages which are produced by the voice message producing means 66, corresponding to the progress of game, or the emotional value of the game character to the player character.

The voice message reading means 68 reads selectively one of the plurality of voice messages registered in the voice message registering means 67 in accordance with the progress of game or the emotional value of the game character to the player character, when there occurs a calling request interrupt for the game character calling to the player character along with the execution of the game in the game executing means 61.

The voice message changing means 69 changes minutely the intonation, volume or total average pitch of the voice message data read by the voice message reading means 68, as required, in accordance with the game scene, conversation context or game character condition, and sends it to the speech signal producing means 71.

The image signal producing means 70 produces and displays a variety of screens or movies in the main game process or the ending process, as well as the game character selection screen, the input screen for the character string indicating the way of calling the player character and the accent type display screen on the basis of the image information from the game executing means 61.

The speech signal producing means 71 produces BGM, an effective sound and a voice message, on the basis of the voice information from the game executing means 61 and the voice message changing means 69, and outputs it.

While in the above description, the present invention is applied to the home game machine, it will be understood that the invention is applicable to the game machines for business service which are installed at the game center or amusement facilities.

The preferred embodiments of the invention which have been described in this specification are only illustrative, but not limitations. The scope of the invention is only limited by the accompanying claims, and includes all the modifications falling within the meanings of the claims.

What is claimed is:

1. A control method of a video game for proceeding with a game in such a way that a player character and a game character communicate in accordance with an operation of a player, in which the game character issues a voice message, comprising the steps of:

inputting and setting by the player a character string indicating a way of calling the player character in accordance with the operation of the player;

creating and registering a voice messages for the game character calling to the player character in accordance with a progress of the game, on the basis of the set character string indicating the way of calling the player character or a preset calling words wherein in creating and registering the voice message more than one accent type of the voice message is displayed on a screen to enable the player to select one at will; and reading and outputting selectively the voice messages registered in accordance with the progress of the game when the game character calls to the player character.

2. The control method of a video game according to claim 1, wherein in the case where a plurality of game characters exist, a plurality of voice messages of the game character calling to the player character may be different for each game character.

3. The control method of a video game according to claim 1, wherein the progress of game is a parameter indicating the relation between the player character and the game character, a game scene, a conversation context, or a state of game character.

4. The control method of a video game according to claim 1, wherein in creating and registering a voice message, at least one of the voice messages created actually is reproduced to enable the player to listen to it.

5. A control method of a video game for proceeding with a game in such a way that a player character and a game character communicate in accordance with an operation of a player, in which the game character issues a voice message, comprising the steps of:

inputting and setting by the player a character string representing a way of calling the player character in accordance with an operation of the player;

creating and registering voice message of the game character calling to the player character, on the basis of the set character string representing the way of calling the player character or a preset calling word, wherein in creating and registering the voice message, a plurality of accent types of the voice message are displayed on a screen to enable the player to select them at will; and reading a registered voice message and outputting at least one of the intonation, volume and total average pitch of the voice message variably in accordance with the progress of the game, when the game character calls to the player character.

6. The control method of a video game according to claim 5, wherein the progress of game is a parameter indicating the relation between the player character and the game character, a game scene, a conversation context, or a state of game character.

7. The control method of a video game according to claim 5, wherein in creating and registering a voice message, at least one of the voice messages created actually is reproduced to enable the player to listen to it.

8. A video game apparatus for proceeding with a game in such a way that a player character and a game character communicate in accordance with an operation of a player, in which the game character issues a voice message, comprising:

means for inputting and setting by the player a character string representing a way of calling the player character in accordance with an operation of the player; means for creating a plurality of voice messages of the game character calling to the player character in accordance with a progress of the game, on the basis of the set character string representing the way of calling the player character or a preset calling word, wherein said voice message creating means has a feature in which a plurality of accent types of the voice message are displayed on a screen to enable the player to select them at will;

means for registering the plurality of voice messages created corresponding to the progress of the game; and means for reading selectively one of the plurality of voice messages registered in said means for registering in accordance with the progress of the game, when the game character calls to the player character.

9. The video game apparatus according to claim 8, further comprising means for storing the mode in creating a plurality of voice messages in accordance with the progress of the game for each of the plurality of game characters.

10. The video game apparatus according to claim 8, further comprising means for varying at least one of the intonation, volume and total average pitch for the read voice message in accordance with the progress of the game.

11. A video game apparatus for proceeding with a game in such a way that a player character and a game character communicate in accordance with an operation of a player, in which the game character issues a voice message, comprising:

means for inputting and setting by the player a character string representing a way of calling the player character in accordance with an operation of the player;

means for creating at least one voice message of the game character calling to the player character, on the basis of the set character string representing the way of calling the player character or a preset calling word, wherein said voice message creating means has a feature in which a plurality of accent types of the voice message are displayed on a screen to enable the player to select them at will;

means for registering said voice message created; and means for varying at least one of the intonation, volume and total average pitch of the voice message registered in said means for registering in accordance with the progress of the game, when the game character calls to the player character.

12. A computer readable medium having a video game program recorded thereon for proceeding with a game in such a way that a player character and a game character communicate in accordance with an operation of a player, in which the game character issues a voice message, wherein said video game program, when read by a computer, enables said computer to perform the steps of:

inputting and setting a character string by the player representing a way of calling the player character in accordance with an operation of the player;

creating and registering a plurality of voice messages of the game character calling to the player character in accordance with a progress of the game, on the basis of the set character string representing the way of calling the player character or a preset calling word, wherein in creating and registering- the voice message, a plurality of accent types of the voice message are displayed on a screen to enable the player to select them at will; and reading and outputting selectively one of the plurality of voice messages registered in accordance with the progress of the game, when the game character calls to the player character.

13. A computer readable medium having a video game program recorded thereon for proceeding with a game in such a way that a player character and a game character communicate in accordance with an operation of a player, in which the game character issues a voice message, wherein said video game program, when read by a computer, enables said computer to perform the steps of:

inputting and setting by the player a character string representing a way of calling the player character in accordance with an operation of the player;

creating and registering at least one voice message of the game character calling to the player character, on the basis of the set character string representing the way of calling the player character or a preset calling word, wherein in creating and registering the voice message, a plurality of accent types of the voice message are displayed on a screen to enable the player to select them at will; and reading a registered voice message and outputting at least one of the intonation, volume and total average pitch of the voice message variably in accordance with the progress of the game, when the game character calls to the player character.

* * * * *